United States Patent [19]

Lewanoni

[11] 4,074,826

[45] Feb. 21, 1978

[54] COLLAPSIBLE CONTAINER

[76] Inventor: Dov Lewanoni, 1187 E. 8th St., Brooklyn, N.Y. 11230

[21] Appl. No.: 694,899

[22] Filed: June 10, 1976

[51] Int. Cl.² .......................... B65D 7/24; B65D 7/20
[52] U.S. Cl. ........................................ 220/6; 280/654; 220/19
[58] Field of Search ............................ 220/6, 307, 19; 280/652, 654; 211/104, 105, 126, 132, 149, 201, 202

[56] References Cited

U.S. PATENT DOCUMENTS

| | | | |
|---|---|---|---|
| 2,363,619 | 11/1944 | Prieto | 280/654 X |
| 2,947,546 | 8/1960 | Berlin | 220/6 X |
| 2,969,988 | 1/1961 | Berlin | 220/6 X |
| 3,235,096 | 2/1966 | Hallock et al. | 211/149 |
| 3,310,317 | 3/1967 | Luff | 220/19 X |

Primary Examiner—Stephen Marcus
Attorney, Agent, or Firm—Kenneth S. Goldfarb

[57] ABSTRACT

Collapsible container comprising a base, front and rear upwardly extending sections interconnected by a plurality of longitudinal members defining side sections and pivotally attached to said upwardly extending sections. The longitudinal members are pivotable from open position to collapsed position so that the front section closes upon said rear section. The former position is secured by stop means attached to the base portion and positioned to bear against the lower portions of generally U-shaped handle member pivotally attached to the uppermost of the longitudinal members to stabilize the container in open position. The longitudinal members are preferably of approximately convex cross section, opening downwardly to facilitate nesting and intromission of said members on rotation of said side sections to collapsed condition. The longitudinal members are preferably constructed of flexible resilient material such as plastic. In a preferred embodiment, the longitudinal members are resiliently, detachably secured to channel members provided on said front and rear sections.

4 Claims, 14 Drawing Figures

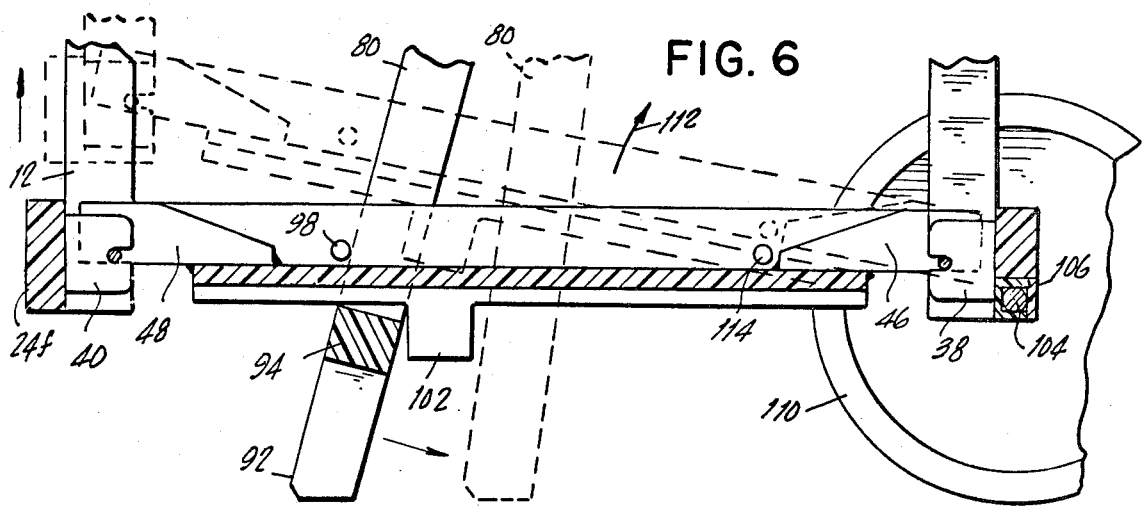
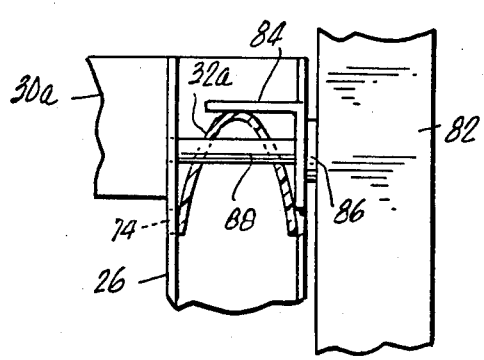
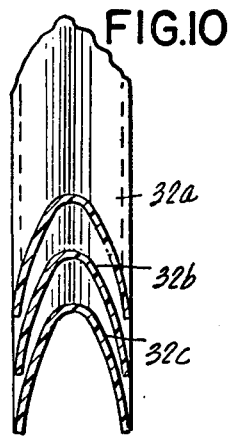
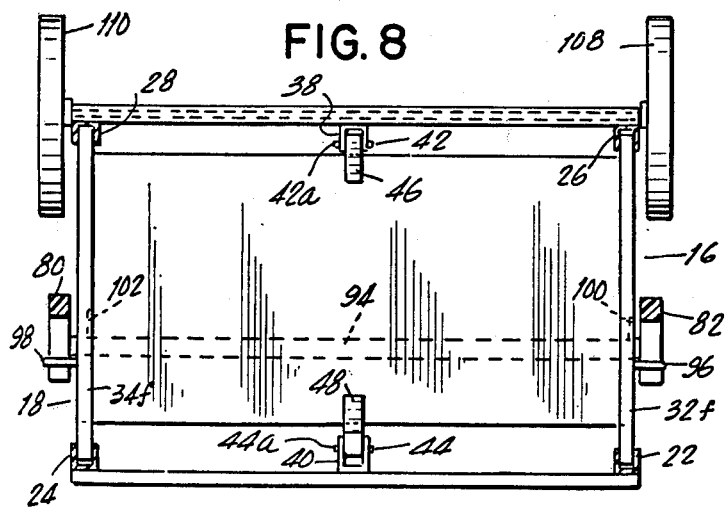
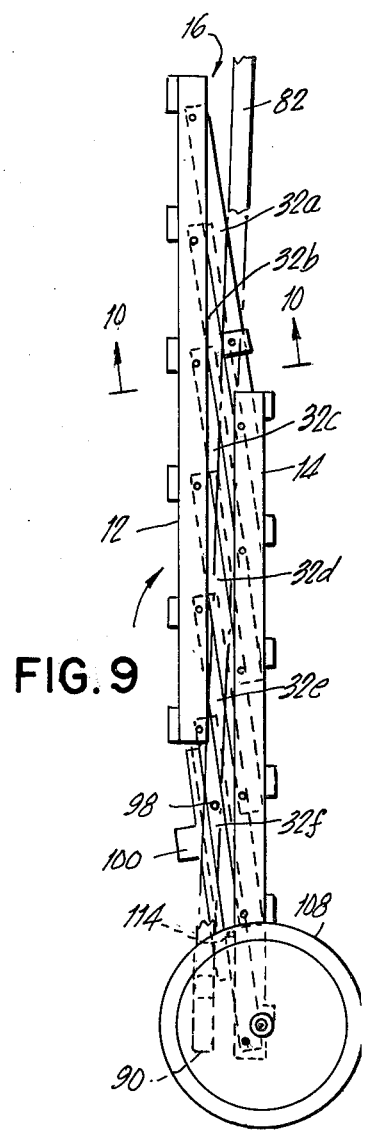
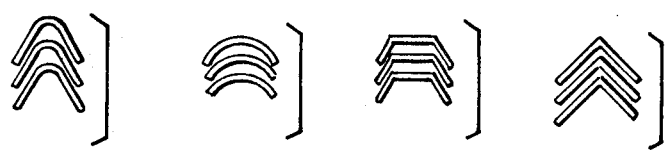

ical parts in

COLLAPSIBLE CONTAINER

BACKGROUND OF THE INVENTION

1. Field of the Invention

This invention relates generally to containers and particularly to collapsible containers capable of being manipulated by relatively simple means to open and collapsed conditions respectively, the container in the collapsed condition occupying a relatively small volume.

2. Description of the Prior Art

Collapsible containers of various constructions and designs and adapted to be hand carried, e.g., milk containers, and/or mounted on conventional axle-wheel assembly means such as shopping carts and the like are well known. In general, such containers are constructed of a plurality of wire frame members for example, which are of relatively complex construction requiring involved procedures for their fabrication. An additional disadvantage often found to characterize such container devices is their inability to be collapsed in simple manner to a form occupying a relatively small volume as compared to the volume occupied by the container in open or normal position. In collapsed form, the container is often bulky untoward etc., and due to its relatively high weight difficult to handle, store, manipulate to open position etc. Moreover, the metallic components of the container due to their method of manufacture, period and conditions of use, etc., often develop burrs or other roughened areas e.g., rust spots, which can lead to snagging and resultant injury to the user and/or the user's clothing. From an aesthetic standpoint alone, the various manifestations of metal degradation can produce an unsatisfactory appearance and thus discourage consumer appeal.

Replacement of damaged parts with metal containers heretofore provided is often a complex procedure necessitating professional assistance. This can prove costly to the consumer not to mention the inconvenience resulting from the non-availability of the container while undergoing repair.

Thus, a primary object of the invention is to provide a collapsible container wherein the foregoing and related disadvantages are eliminated or at least mitigated to a substantial extent.

Another object of the invention is to provide such a container wherein essential parts can be prepared by injection molding techniques having flexible, resilient, high strength, e.g., high impact resistance, characteristics.

Yet another object of the invention is to provide such a container which may be readily opened and collapsed by relatively simple means and with a minimum of effort.

Still another object of the invention is to provide such a container wherein any requirement for the use of metal parts is eliminated and thus the corrosion problems inherent therewith or at least minimized at the option of the manufacturer.

A further object of the invention is to provide such a container capable of being collapsed to a form occupying a relatively small volume thus minimizing space requirements and facilitating handling, manipulation etc.

Yet a further object of the invention is to provide such a container wherein essential parts may be simply replaced as required by the consumer.

A still further object of the invention is to provide such a container of light weight construction and which can be supplied to the consumer in at least partly disassembled form thereby facilitating shipping, storage, etc.

Yet a still further object of the invention is to provide such a container wherein at least a majority of the component parts can be prepared from high strength plastic material capable of being colored by various dyes, pigments and the like to produce aesthetically pleasing effects.

Other objects and advantages of the invention will become more apparent hereinafter as the description proceeds.

The foregoing objects are attained in accordance with the invention which in its broader aspects provides a collapsible container comprising a plurality of channel members, means for mounting said channel members, a plurality of interconnecting members of substantially convex construction, said channel members or said interconnecting members having pairs of aligned openings therein the other of said members having pairs of stub axles integrally formed therewith, said interconnecting members being compressible so that said stub axles are received within said pairs of aligned openings to pivotally interconnect said interconnecting members between two opposed channel members.

In accordance with a particularly preferred embodiment, the invention provides a collapsible container movable to normally open and collapsed positions respectively comprising front and rear, upwardly extending sections interconnected by a plurality of longitudinal members defining opposed side sections, said longitudinal members being pivotally attached to said upwardly extending sections and including opposed, uppermost and lowermost of said longitudinal members, a base attached to said lowermost longitudinal member, said upwardly extending sections, said side sections and said base in open position forming a container for receiving articles, said longitudinal members being pivotable from said open position to a collapsed position so that said front section closes upon said rear section, handle means including an upper transverse handle portion and downwardly extending leg members pivotally attached to said uppermost longitudinal member, said leg members providing vertical support means for said container in open position, stop means on said base for normally engaging said leg members to stabilize said container in open position.

The invention is explained but not limited by reference to the accompanying drawing wherein:

BRIEF DESCRIPTION OF THE DRAWINGS

FIG. 6 is a sectional view taken along the line 6—6 in FIG. 1 illustrating the arrangement of certain parts in open and partly collapsed position;

FIG. 7 is a sectional view taken along the line 7—7 in FIG. 2;

FIG. 8 is a sectional view taken along line 8—8 in FIG. 2;

FIG. 9 is a side elevation view illustrating the container in collapsed condition;

FIG. 10 is a sectional view taken along the line 10—10 in FIG. 9;

FIG. 11-14 illustrate various designs of longitudinal members useful in the container and being depicted in nested position;

DETAILED DESCRIPTION OF THE INVENTION

Figure 1:
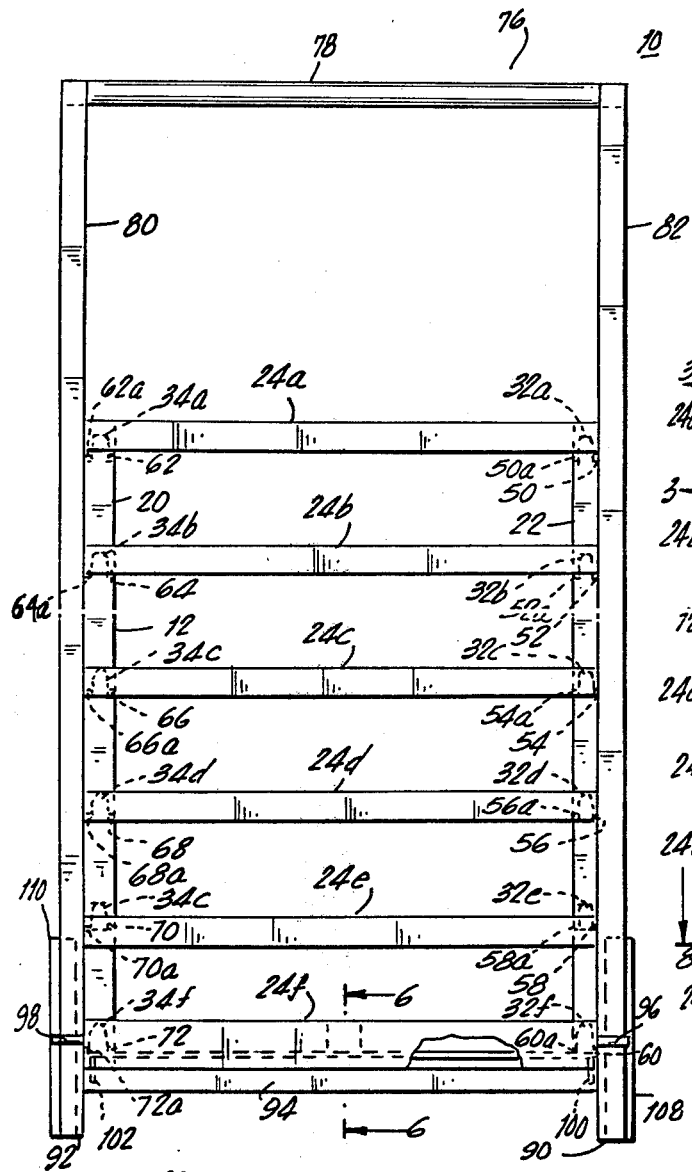
FIG. 1 is a front elevational view shown partly broken away of a collapsible container in accordance with an embodiment of the invention.

With further reference to the accompanying drawings wherein like reference numberals designate similar parts throughout the several views, reference numeral 10 generally designates a collapsible container having front and rear upwardly extending sections generally designated 12 and 14 respectively, and side sections generally designated 16 and 18 respectively. Front section 12 comprises upstanding support members 20 and 22 interconnected by transverse members 24a, 24b, 24c, 24d, 24e and 24f. Rear section 14 comprises upstanding support members 26 and 28 interconnected by transverse members 30a, 30b, 30c, 30d, 30e and 30f.

Side sections 16 and 18 each comprise a plurality of longitudinal members which interconnect front and rear sections 12 and 14; side section 16 (FIG. 2) comprises longitudinal members 32a, 32b, 32c, 32d, 32e, and 32f, while side section 18 comprises opposed longitudinal members 34a, 34b, 34c, 34d, 34e, and 34f. Base portion 36 may be attached to or integral with bottommost longitudinal members 32f and 34f is supported along its lateral edge portions by channel members 38 and 40 attached to or integral with bottom transverse members 24f and 30f and having opposed, aligned openings for receiving stub axles 42, 42a and 44 and 44a of tubular members 46 and 48 respectively. The latter are attached to or integral with the lateral edge portions of base 36. Tubular members 46 and 48 preferably have the cross section as illustrated in FIG. 3 for longitudinal member 32a. The combination of front and rear sections 12 and 14, side sections 16 and 18 and base portion 36 define a container for receiving various articles such as would be accumulated by the comsumer during shopping.

As illustrated in FIG. 8, upwardly extending support members 20, 22, 26 and 28 can be of generally U-shaped cross section having outwardly facing channels for receiving the end portions of the interconnecting longitudinal members 32a-32f and 34a-34f. As illustrated in FIGS. 3 and 4, the end portion of longitudinal member 32a received within the channel of upwardly extending support member 22 is provided with stub axles 50 and 50a which fit into opposed, aligned openings 52 and 52a provided in support member 22, the attached position being illustrated in FIG. 4. The remaining longitudinal members are attached to their corresponding upwardly extending support members in identical fashion by means of stub axles 54, 54a, 56, 56a, 58, 58a, 60, 60a, 62, 62a, 64, 64a, 66, 66a, 68, 68a, 70, 70a, 72 and 72a, each engaging opposed aligned openings provided in the corresponding, upwardly extending support member in the manner illustrated in FIG. 4. The opposed end portions of the longitudinal members received within the channels of support members 26 and 28 of rear section 14 are attached as described in connection with FIGS. 3 and 4 by virtue of stub axles generally designated 74 in FIG. 2 and corresponding openings provided in support members 26 and 28.

The longitudinal members interconnecting front section 12 and rear section 16 are preferably of substantially convex construction, opening downwardly, as illustrated in cross section in FIGS. 3 and 4. Although illustrated in FIGS. 3 and 4 as being of substantially arcuate configuration, it wiil be understood that the particular shape or design may be varied such as illustrated in FIGS. 11-14 provided such longitudinal members open downwardly to facilitate nesting and intromission thereof when pivoted to collapsed condition such as illustrated in FIG. 9 and to be discussed in greater detail hereinafter.

It will be further understood that the illustrated means for attaching the longitudinal members to the support members 20, 22, 26 and 28 may be reversed, i.e., the longitudinal members may be provided with opposed pairs of openings for receiving stub axles provided within the channel or support members 20, 22, 26 and 28.

For ease of transport, container 10 is provided with handle 76 which may be of generally U-shaped design illustrated as comprising a transverse gripping portion 78 and downwardly extending leg members 80 and 82 which are pivotally attached to opposed uppermost longitudinal members 32a and 34a as illustrated in FIG. 7. Leg member 82 of handle 76 is provided with axle or pin member 88 which is pivotally engaged within opposed, aligned openings provided in longitudinal member 32a. Right angle flange or plate 84 in combination with washer 86, also provided with openings for receiving axle 88, secure the connection of parts. Leg member 80 is pivotally secured to longitudinal member 34a in identical fashion. It will be understood that the shape of the handle may be varied as desired, e.g., circular or otherwise arcuate, rectilinear etc., this being a non critical aspect of the invention.

Figure 2:
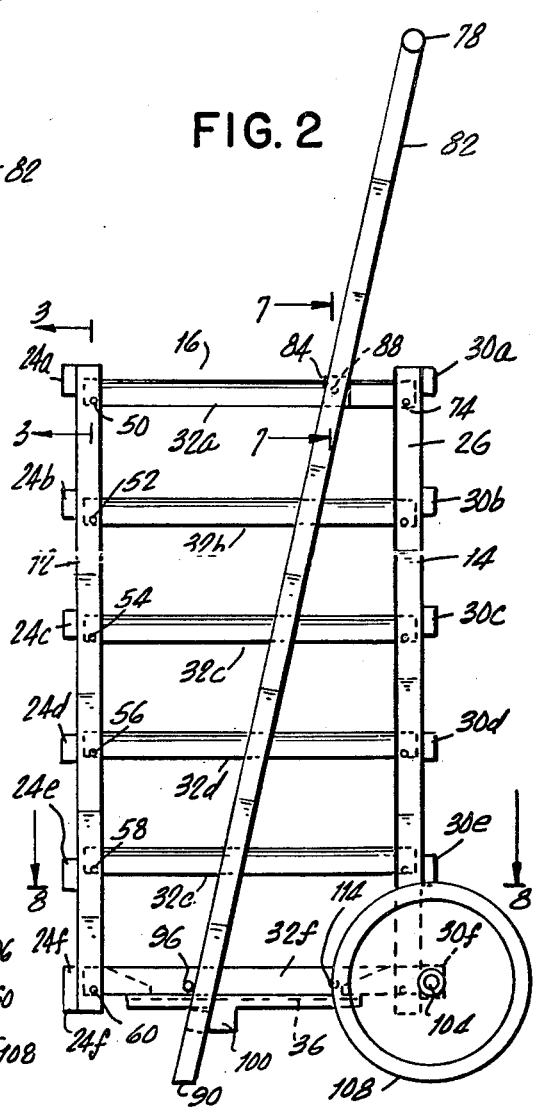
FIG. 2 is a side elevational view of the container of FIG. 1.
Figures 3, 4:
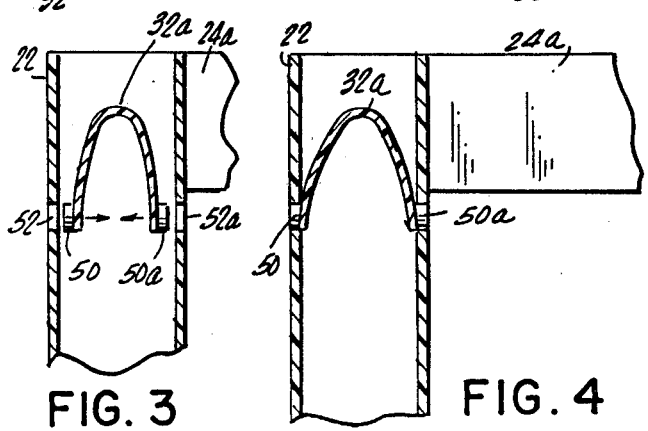
FIG. 3 is a sectional view taken along the line 3—3 in FIG. 2.
FIG. 4 is similar to FIG. 3 and illustrating the attached position of a longitudinal member in accordance with the invention.
Figure 5:
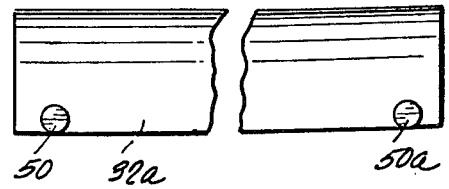
FIG. 5 is a side view of a longitudinal member in accordance with the invention.

As best illustrated in FIGS. 1 and 2, leg members 80 and 82 of handle 76 extend downwardly at a forwardly inclined angle the lower edges 90 and 92 providing vertical support means for the container when in the open or normal, i.e., non-collapsed position illustrated in FIGS. 1 and 2. The bottom portions of leg members 80 and 82 are connected by shaft means 94 extending transversely under base 36. Handle 76 is secured in normal position by stop pins 96 and 98 attached to or integral with base portion 36. Lug members 100 and 102 attached to or integral with base portion 36 normally bear on shaft means 94 as best illustrated in FIG. 2, the combined coaction of stop pins 96 and 98 and lug members 100 and 102 stabilizing the container in open position. Axle 104 rotatably supported within axle housing 106 supports wheel members 108 and 110 enabling the collapsible container 10 illustrated in the form of a shopping cart, to be easily moved by the user.

The initial phase of pivoting the container to closed position from open position is illustrated in FIG. 6. In open position, stop pins 96 and 98 bear against leg members 80 and 82 as illustrated in FIGS. 2 and 6; simultaneously, lugs 100 and 102 bear against shaft 94. Movement of leg members 80 and 82 is thus prevented thereby fixing and stabilizing container 10 in the open position illustrated in FIGS. 1 and 2. Legs 80 and 82 are most easily released from locking engagement with stop pins 96 and 98 and lugs 100 and 102 by simply exerting an upwardly and rearwardly directed pulling force to uppermost transverse member 24a as indicated by directional arrow 112 in FIG. 6. The container section is thus lifted to a position wherein lugs 100 and 102 are positioned above shaft means 94 as indicated by the phantom lines in FIG. 6. Leg members 80 and 82 are now free to move to the upstanding position illustrated in FIG. 9 where leg 82 bears against stop pin 114 on base position 36. An opposed stop pin (not shown) provided on base portion 36 similarly engages leg member 80. Continued pulling of transverse member 24a causes the longitudinal members to pivot about their points of attachment resulting in the closing of front section 12 and side sections 16 and 18 upon rear section 14. As illustrated in FIG. 9, front section 12, rear section 14 and leg members 80 and 82 are substantially vertically disposed.

In a preferred embodiment, the longitudinal members are of convex cross section opening downwardly as illustrated in FIGS. 3 and 4 and 10-14. This allows nesting and intromission of such members in the manner illustrated schematically in FIGS. 11-14 enabling more effective collapsing of the container to a form occupying minimim volume. Thus, the outer arcuate surface of each of the longitudinal members is urged to nest within the concave portion, i.e., downwardly opening channel of the adjacent, upper longitudinal member thereby achieving the collapsed condition of FIG. 10. Due to the improved nesting feature provided herein, the longitudinal members in the collapsed condition approach a substantially vertical condition wherein they are substantially parallel with respect to front and rear sections 12 and 14 respectively (FIG. 9). In general, the longitudinal members form an angle of from about 10° to 40° with the front and rear vertical sections 12 and 14 when the container is in the collapsed condition and thus can approach a closely parallel relationship therewith.

Front and rear sections 12 and 14 although illustrated as comprising a plurality of transverse members can be of any design and of unitary construction pivotally attached to the longitudinal members as explained. In accordance with a particularly preferred embodiment, the front and rear sections comprise a plurality of separate, vertically arranged, channel members for pivotally receiving the end portions of the longitudinal members and means for mounting such channel members. As illustrated in the drawings, the upstanding support members 20, 22, 26 and 28 provide continuous channels for receiving the longitudinal members.

The present collapsible containers, although illustrated in the form of a shopping cart, may take many forms, including milk containers, shopping containers, etc., adapted to be hand carried. In these embodiments, the wheel axle assembly illustrated in the drawings can of course be omitted.

A particularly important advantage of the invention as that practically all parts can be made of plastic by conventional injection molding techniques. Particularly preferred are the high impact, high resilient film-forming, materials such as polypropylene, polyethylene, polyvinyl chloride and the like. Plastics of this type can be colored with a wide variety of dyes, pigments organic and/or inorganic to produce various aesthetically pleasing effects. The use of plastic avoids the problems associated with metals such as rusting, petting, development of burrs, etc., which can be injurious to the consumer and/or wearing apparel.

The resilient characteristic of the plastic material enables detachable assembly of the component parts; as illustrated in FIGS. 3 and 4, the sidewalls of longitudinal member 32a can be compressed for insertion into its corresponding channel portion, the release of the applied pressure resulting in expansion of the sidewalls whereby the stub axle 50 and 50a are received within the corresponding openings provided in the channel member. Thus, if for any reason a longitudinal member is broken or otherwise rendered inoperative, it can be easily replaced by the consumer. Likewise, when using a plurality of separate channel members, these members may also be easily replaced by the consumer as required this being an outstanding advantage of this particular embodiment of the invention.

A latitude of modification, substitution and change is intended in the foregoing disclosures, and in some instances some features of the present invention may be employed without a corresponding use of other features.

What is claimed is:

1. A collapsible container comprising a plurality of channel members, means for mounting said channel members, a plurality of interconnecting members of substantially convex construction, said channel members or said interconnecting members having pairs of aligned openings therein the other of said members having pairs of stub axles integrally formed therewith, said interconnecting members being compressible so that said stub axles are received within said pairs of aligned openings to pivotally interconnect said interconnecting members between two opposed channel members.

2. A collapsible container according to claim 1 wherein said interconnecting members are provided with said stub axles integrally formed therewith and said channel members are provided with said pairs of aligned openings.

3. A collapsible container movable to normally open and collapsed positions respectively comprising from and rear upwardly extending sections interconnected by a plurality of longitudinal members defining opposed side sections, said longitudinal members being pivotally attached to said upwardly extending sections and including opposed, uppermost and lowermost of said longitudinal members, a base attached to said lowermost longitudinal members, said upwardly extending sections, said side sections and said base in open position forming a container for receiving articles, said longitudinal members being pivotable from said open position to a collapsed position so that said front section closes upon said rear section, handle means including an upper transverse handle portion and downwardly extending leg members pivotally attached to said uppermost and longitudinal member, said leg members providing vertical support means for said container in open position, stop means on said base for normally engaging said leg members to stabilize said container in open position, said longitudinal members being of approximately convex cross section normally opening downwardly to facilitate intromission or nesting thereof on upwardly and rearwardly directed rotation of said front and side sections from normally open to collapsed condition.

4. A collapsible container movable to normally open and collapsed positions respectively comprising front and rear upwardly extending sections interconnected by a plurality of longitudinal members defining opposed side sections, said longitudinal members being pivotally attached to said upwardly extending sections and including opposed, uppermost and lowermost of said longitudinal members, a base attached to said lowermost longitudinal emebers, said upwardly extending sections, said side sections and said base in open position forming a container for receiving articles, said longitudinal members being pivotable from said open position to collapsed position so that said front section closes upon said rear section, handle means including an upper transverse handle portion and downwardly extending leg members pivotally attached to said uppermost and longitudinal member, said leg members providing vertical support means for said container in open position stop means on said base for normally engaging said leg members to stabilize said container in open position, wherein said upwardly extending sections including pairs of channel members having aligned openings therein, said longitudinal members being resiliently, upwardly convex and having pairs of stub axex integrally formed adjacent the ends thereof, said stub axes being received in said openings and resiliently held therein by said convex longitudinal member.

* * * * *